United States Patent [19]
Hatch et al.

[11] 4,271,937
[45] Jun. 9, 1981

[54] VALVES FOR HYDRAULIC BRAKES

[75] Inventors: Donald Hatch, Whaley Bridge; Christopher R. Ellis, Chinley; Richard H. Gibbon, Chapel-en-le-Frith; Walter R. Stirling, Buxton, all of England

[73] Assignee: Ferodo Limited, Great Britain

[21] Appl. No.: 855,807

[22] Filed: Nov. 29, 1977

Related U.S. Application Data

[63] Continuation-in-part of Ser. No. 610,426, Sep. 4, 1975, abandoned.

[30] Foreign Application Priority Data

Sep. 25, 1974 [GB] United Kingdom ............... 41809/74

[51] Int. Cl.³ .......................................... F16D 65/853
[52] U.S. Cl. ............................. 188/264 F; 188/264 P; 192/113 B
[58] Field of Search .............. 188/71.6, 264 R, 264 D, 188/264 E, 264 F, 264 P; 192/113 B; 137/115

[56] References Cited
U.S. PATENT DOCUMENTS

| 2,395,941 | 3/1946 | Rockwell | 137/115 |
| 2,966,966 | 1/1961 | Eames | 188/264 F |
| 3,715,017 | 2/1973 | Jenny | 137/115 |
| 3,908,688 | 9/1975 | Gandrud | 137/115 |
| 3,924,712 | 12/1975 | Stirling et al. | 188/264 F |
| 3,960,249 | 6/1976 | Stirling | 188/264 P |

FOREIGN PATENT DOCUMENTS

| 1289956 | 2/1962 | France | 188/264 F |
| 450762 | 8/1949 | Italy | 188/264 F |
| 861334 | 2/1961 | United Kingdom | 188/264 F |

Primary Examiner—Edward R. Kazenske
Attorney, Agent, or Firm—Charles E. Brown

[57] ABSTRACT

Hydraulically-operable rotary friction brake comprising a retarding device incorporating hydraulically actuated operating members have a hydraulic circuit including a valve whereby in periods of operation a major portion of the hydraulic flow is directed through the hydraulically actuated operating members and in periods of non-actuation only a minor proportion of the hydraulic flow is directed through the operating members.

10 Claims, 11 Drawing Figures

VALVES FOR HYDRAULIC BRAKES

This Application is a Continuation in part of our copending U.S. Patent application Ser. No. 610,426, filed Sept. 4, 1975, now abandoned.

BACKGROUND TO THE INVENTION

This invention relates to a hydraulically-operated friction brake of the kind wherein the hydraulic liquid also provides the medium for removing the heat generated during operation of the brake. The construction and operation of one such friction brake is disclosed in our German Offenlegungschrift 2446669 and in the U.S. Patent Application Ser. No. 510,126 directly corresponding thereto. Said U.S. Application is now U.S. Pat. No. 3,924,712, which claims priority from the same eight British Patent Applications as does said German Offenlegungschrift.

In general terms, the friction brake of the aforesaid Offenlegungschrift comprises (i) a casing, (ii) a rotary member mounted in the casing, (iii) a pressure-operable retarding device arranged and adapted to act upon the rotary member to generate retarding torque. (iv) a pump for circulating hydraulic liquid, (v) two separate fluid circuits provided between the pump and the retarding device, one being an actuating circuit arranged and adapted to operate the retarding device, and (vi) valve means comprising (a) a valve member, (b) a first valve elememt secured to said member, (c) a second valve element slidable on said member and urged away from the first valve element by a spring and constituting pressure sensitive means arranged and adapted to control distribution of flow of hydraulic liquid between the two circuits, and (d) means for equilibrating hydraulic pressure across the valve means.

More specifically, the brake just recited comprises a casing, a rotary member housed therein and connectable to a vehicle propellor shaft and associated therewith a pressure-operated retarding device (iii) comprising (a) annular friction plates mounted on the rotary member, (b) annular stator plates mounted on the casing and interleaved with the friction plates, the stator and friction plates (collectively referred to hereafter as the 'pack') being relatively axially slidable under the action of (c) an hydraulically-operable actuator in the form of a piston-and-cylinder device or bellows piston to bring the stator and friction plates into contact and generate therebetween a retarding torque on the rotatable member. A pump circulates hydraulic liquid through at least one hydraulic circuit which includes the pack and a cooling means and which has a branch through which hydraulic liquid is supplied to operate the actuator piston when it is desired to operate the retarding device. In the arrangement disclosed, the casing is filled with hydraulic liquid, leaving only such space as is necessary to accommodate the increase in the volume of the hydraulic liquid which occurs when the liquid absorbs heat during periods of actuation of the retarding device, and the hydraulic liquid is circulated through the pack even during periods of non-actuation of the retarding device as long as the vehicle to which the brake if fitted is in motion. This continuous circulation of at least a major proportion of the hydraulic liquid through the pack causes a significant amount of 'drag' with absorption of power which could be used more efficiently elsewhere.

BRIEF DESCRIPTION OF THE INVENTION

It is an object of the present invention to reduce the aforementioned drag by providing in the brake just described a hydraulic circuit which includes valve means arranged and adapted to control the flow of hydraulic liquid through the pack so that (1) during periods of actuation of the retarding device at least a major proportion of the flow is directed through the pack and (2) during periods of non-actuation of the retarding device not more than a minor proportion of said flow is directed through the pack.

BRIEF DESCRIPTION OF PREFERRED EMBODIMENTS

The invention is based on the concept that if the volume of hydraulic liquid contained in the friction brake at the maximum operating temperature thereof, is less than the total volume of the interior of the brake (casing plus cooling means etc.) the pack can be used, in effect, as a kind of centrifugal pump operating so that, if the hydraulic supply circuit to the pack is partly occluded or even closed, the pack will tend to pump itself substantially empty of hydraulic liquid; conversely if the effect of the supply occlusion is removed or decreased and the circuit is occluded at the outlet from the pack, the pack will be flooded with hydraulic liquid. The second of these actions is effected when it is desired to actuate the retarding device; the volume of hydraulic liquid in the brake at the maximum operating temperature is selected so that the pack will remain substantially free from hydraulic liquid during periods of non-actuation of the retarding device. A high pressure "bleed" from the actuator to a point down-stream of the pack may be necessary for safety reasons. It may not be necessary to provide a separate pump to circulate the hydraulic liquid; the use of such a pump is however, preferred at present. The free space left within the brake when it contains the selected volume of hydraulic liquid may contain air or a relatively inert gas such as nitrogen, this gas being compressed when the hydraulic liquid undergoes thermal expansion. The ambient pressure within the brake casing is preferably less than 10 p.s.i. and more preferably less than 5 p.s.i.

In one particularly preferred embodiment, provision is made to circulate the hydraulic liquid by means of a pump through two circuits, one being the circuit for actuation of the retarding device as aforesaid, and the other being an 'idle' circuit for circulation of a major proportion of the hydraulic liquid during periods of non-actuation of the retarding device. The valve means is then arranged and adapted to control distribution of the hydraulic liquid to permit (a) circulation of hydraulic liquid in said one circuit in turn through the retarding device, cooling means and the pump, whilst simultaneously transmitting actuating pressure to the actuator during periods of actuation of the retarding device and (b) circulation of at least a major proportion of the hydraulic liquid through the said other circuit to the cooling means and the pump simultaneously with not more than a minor proportion of the hydraulic liquid through the said one circuit during periods of non-actuation of the retarding device.

Preferred embodiments of the present invention will now be further described by way of example with reference to the accompanying drawings.

DESCRIPTION OF THE DRAWINGS

FIGS. 1 and 2, in conjunction with FIG. 11, illustrate schematically the hyraulic liquid flow circuits and functioning of a friction brake of the kind set forth in our German Offenlegungschrift No. 2446669 and in the U.S. Pat. No. 3,924,712 directly corresponding thereto. Referring specifically to this prior disclosure, a retarding device in the brake comprises annular friction plates 1, axially slidable on and driven by a rotatable shaft which is to be braked, interleaved with annular friction plates 2 which are themselves axially slidably relative to said shaft on pins secured in the brake casing; the brake includes a pump 3, driven from the rotatable shaft, a heat exchanger 4 for cooling the hydraulic liquid, a valve means 5 for controlling the distribution of flow of hydraulic liquid within the hydraulic circuit and an actuator in the form of an annular bellows 6, all in fluid communication, exactly as in the corresponding components of the brake disclosed in our aforesaid German Offenlegungschrift No. 2446669. The duct 7, linking the valve means 5 directly to the heat exchanger, is provided with a device 8 for venting to the interior of the casing hydraulic liquid in said duct 7, whenever the pressure of the liquid in the duct (and hence in the heat exchanger) reaches a predetermined limit.

In use, the brake contains a volume of hydraulic liquid insufficient to occupy the whole of the free space within the casing at maximum operating temperature and is mounted in a vehicle with the rotatable shaft connected to or forming part of the propellor shaft thereof; the motion of the vehicle rotates the shaft, driving the pump and causing hydraulic liquid to flow within the hydraulic circuits of the brake. FIG. 1 illustrates the situation when the vehicle is moving and the brake is in the non-actuated condition, i.e. when no retarding torque is generated on the rotatable shaft. The continuous arrowed lines in FIG. 1 illustrate the flow path of the major portion of the hydraulic liquid, from the pump 3 to the valve means 5, to the heat exchanger 4 and back to pump 3. The dotted line 9 illustrates the partly occluded path taken by a minor proportion of the hydraulic liquid, from the valve means 5 through the pack of disengaged friction and stator plates to maintain them 'wet' and minimize friction between them, before rejoining the main flow to the heat exchanger 4. In this case the feed 10 is vented to ensure that there is not enough hydraulic pressure in it to operate the actuator (bellows piston 6). It will be appreciated that the brake casing constitutes a reservoir for the liquid although it is not explicitly shown in any of the figures.

FIG. 2 illustrates the situation when the valve means 5 is actuated to reduce the speed of the vehicle, for example on a downhill run; the valve means 5 when thus actuated considerably alters the distribution of the flow. The line 10 is opened to allow hydraulic liquid to pressurise the bellows piston 6 to compress the pack of friction and stator plates axially of the shaft so that frictional engagement between said plates within the pack will generate a retarding torque on the shaft to slow its speed of rotation. Simultaneously, therewith the flow of hydraulic liquid is diverted through the pack, to the heat exchanger 4, back to the pump 3 and valve means 5, (as shown by continuous arrowed lines) the duct 7 being closed. The circuit from the outlet of the pack is essentially occluded relative to the supply circuit to the pack.

FIG. 3 illustrates a preferred valve means, 5, for use in the circuit of FIGS. 1 and 2; this comprises a body portion 11, constituted by an insert within the brake casing and having a bore 12 therein with an enlarged diameter end portion 13. Mounted within said bore is an axially-movable three element valve member in the form of a rod 14 having first valve element 15 secured thereto, a second valve element 16 slidable on the rod 14 and urged away from the element 15 by means of a return spring 17, and a third valve elememt 18 having bores 19 therethrough and held on the rod 14 by means of a split-ring 20. Duct 21 leads to the outlet from the pump 3, of FIGS. 1 and 2; 22 is the outlet from the valve means 5 to the heat exchanger 4 via duct 7; duct 23 is the outlet to the line 9 feeding the pack 1, 2; duct 24 is the outlet to the actuator feed line 10, and 25 is a by-pass line to permit flow of hydraulic liquid from the pump outlet 21 to the duct 24 on downward movement of element 15 by the rod 14 and also to effect pressure balance across the valve means when the brake is in the actuated condition, thereby retarding the vehicle. Orifice 26 vents bore 12 to the interior of the brake casing to prevent liquid being trapped therein. The end portion 13 is of enlarged diameter to permit flow of hydraulic liquid from the pump outlet 21 through axially directed bores 19 in element 18 to outlet 23 when the rod 14 is moved downwards to actuate the brake. Otherwise the element 18 would prevent flow when displaced downward by the rod 14. It should also be noted that the valve element 18 is made in a size such that hydraulic liquid may 'leak' in a controlled manner between it and the adjacent wall of the bore 12, to allow the flow of a minor proportion of the hydraulic liquid to the pack to keep it lubricated during periods of non-actuation of the retarding device. That is, the narrow space between the valve element 18 and the wall of the bore 12 acts as a controlled restriction on the hydraulic liquid flow through the pack.

The operation of the brake incorporating the valve means will be readily apparent to those skilled in the art from the above description, taken in conjunction with the disclosures of our aforesaid German Offenlegungschrift and U.S. Pat. No. 3,924,712 corresponding thereto.

Figure 1:
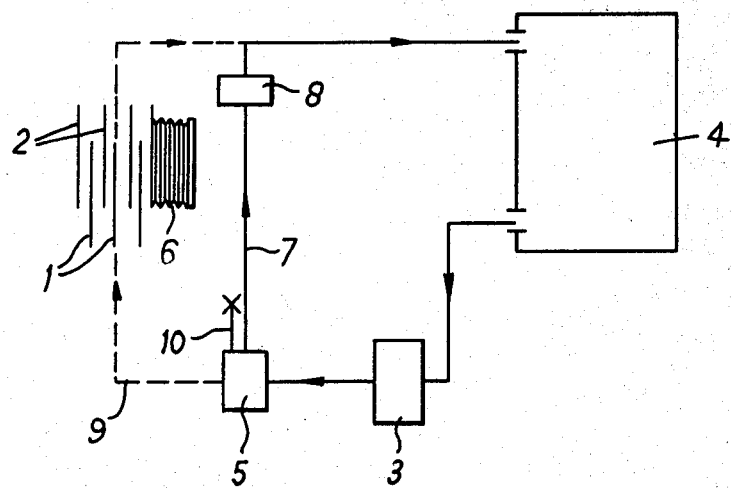
FIG. 1 is a diagram illustrating the hydraulic flow through the circuits of a vehicle brake, in the non-actuated condition.
Figure 2:
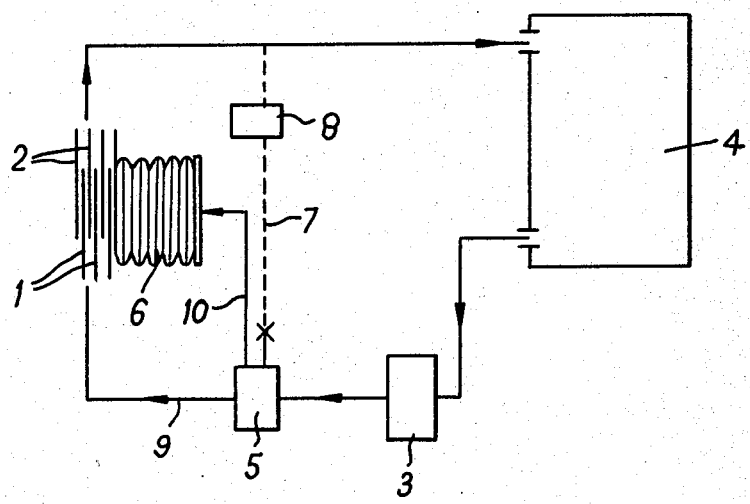
FIG. 2 is a diagram similar to that of FIG. 1, showing the flow in the circuits when in the actuated condition.

However, for the avoidance of doubt depression of the rod 14 against the return spring 17 progressively displaces the elements 15, 16 and 18 downwardly to permit liquid actuation of the bellows piston 6 of FIGS. 1 and 2, and thus engage the friction plates, whilst simultaneously therewith directing the liquid flow or at least a major portion thereof through the pack and heat exchanger in order to cool the brake. Releasing the rod 14 restores the valve elements to the position shown in FIG. 3 thereby disengaging the plates in the pack and cutting the liquid flow therethrough to the minimum necessary to merely lubricate the pack.

Figure 3:
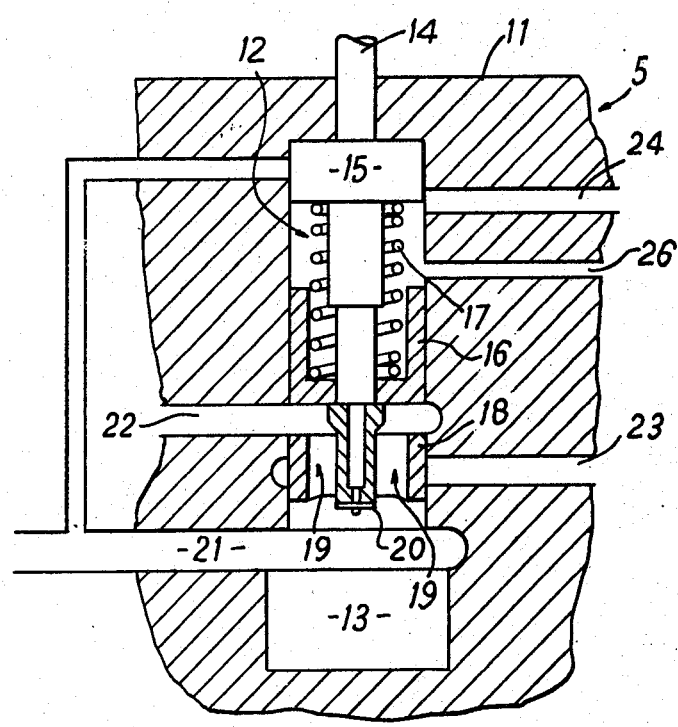
FIG. 3 is a diagrammatic cross-section of valve means suitable for use in the brake of FIGS. 1 and 2.
Figure 4:
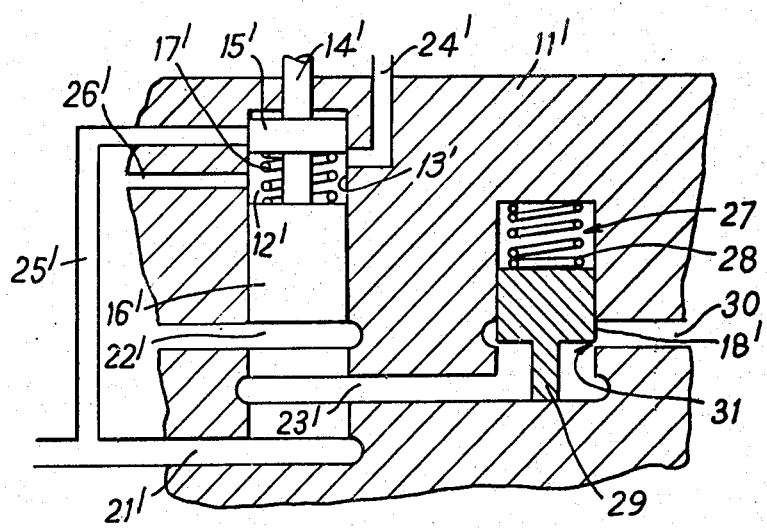
FIG. 4 is a diagrammatic cross-section of a modified valve means for use in the brake of FIGS. 1 and 2.

FIG. 4 illustrates a modification of the valve means 5 as shown in FIG. 3, primed numerals being used in FIG. 4 to indicate equivalent parts.

It can be seen that in this modification the valve means comprises a valve body 11' with bore 13' therein housing two valve elements 15' and 16' mounted on actuating rod 14', with the outlets 21', 22', 23', 24' bypass 25' and orifice 26' analogously disposed with respect to the corresponding components of the valve means of FIG. 3. However, in this modification, the third valve element 18' is located in a second bore 27 in the valve body 11' communicating with outlet 23'. The element 18' includes a buffer element 29 dimensioned so as to define a narrow opening 31 between the valve element 18' and the body portion 11', which opening communicates with a duct 30 (corresponding to duct 23 of FIG. 3) leading to the pack supply line 9. A spring 28 is provided to urge the buffer element 29 into the position shown in FIG. 4, thereby partly occluding the duct 30.

In this modificaton, shown in FIG. 4 as also being in the non-actuated condition, hydraulic liquid leaks in minor proportion through outlet 23' and opening 31 to duct 30, thence to the pack so as to maintain a 'trickle' feed to the 'pack' during periods of non-actuation of the retarding device. When the valve rod 14' is moved downwards to actuate the retarding device as described earlier, duct 22' is occluded, thereby directing the flow into the duct 23' and against the underside, of element 18' which rises against the spring 28 to allow the full flow of the hydraulic liquid to the duct 30 leading to the pack and from the pack to the heat exchanger, outlet 22' now being closed by the element 16'.

In the embodiment described above it may be found that a back-pressure is induced in the heat-exchanger 4, which tends to 'flood' the pack in spite of the centrifugal pumping action of the pack described earlier.

Figure 6:
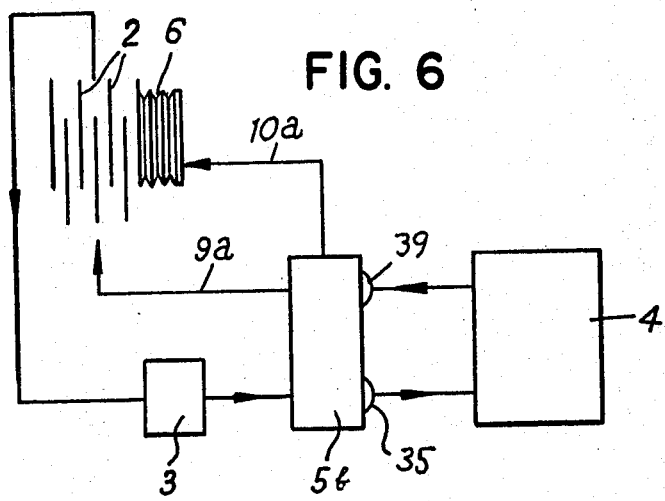
FIG. 6 is a diagram illustrating the hydraulic flow through the circuits of a vehicle brake using the valve means of FIG. 5, in the actuated condition.
Figure 7:
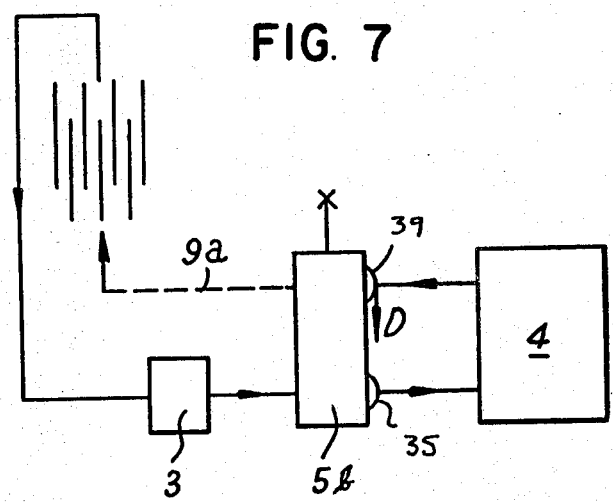
FIG. 7 is a diagram similar to that of FIG. 6 but showing the flow in the 'off' non-actuated condition.

In this case, resort may be had to the embodiment to be described with reference to FIGS. 5 to 7 inclusive, wherein components and parts similar in function to those described above with reference to FIGS. 1 to 4 are suffixed 'b'.

Figure 5:
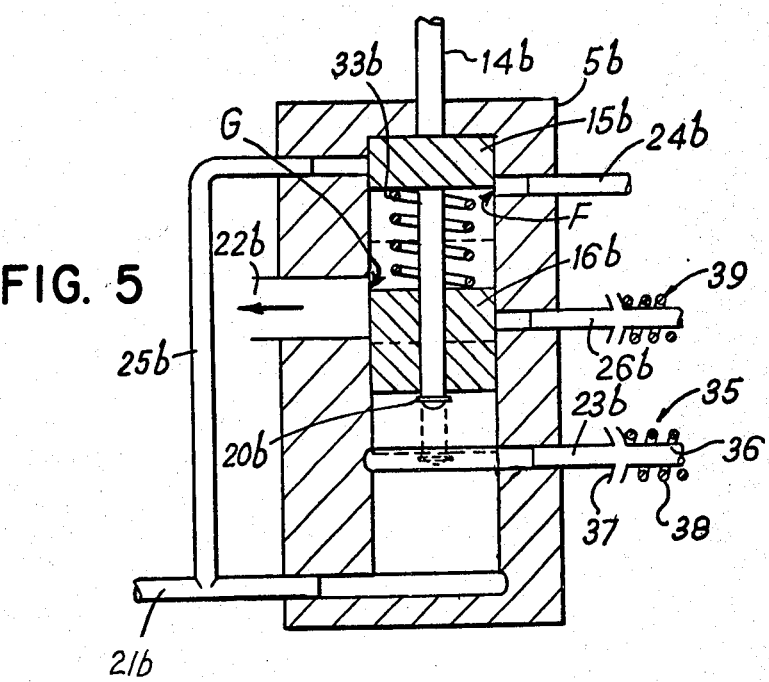
FIG. 5 is a diagrammatic cross-section of another valve means.

FIG. 5 shows a valve means 5b in the non-actuated condition (the dotted lines showing the position of the valve element 16b when in the actuated condition, the general arrangement being similar in operation to that shown in FIG. 3, except that the third valve element 18 is omitted and duct 26 is replaced by an inlet port 21b which is in direct fluid communication with the outlet from the heat exchanger and, when the retarding device is actuated (valve element 16b in the position indicated by dotted lines), with the outlet 22b communicating with the pack and hence with the pump inlet. The outlet 23b communicates with the heat-exchanger inlet and is provided with a pressure relief device 35 in the form of a sleeve 36 urged against a cup 37 by means of a spring 38 (as described with reference to FIG. 3. in our German Offenlegungschrift 2446669 and U.S. Pat. No. 3,924,712). The vent to the casing, 26b, is provided with a similar pressure relief device 39 venting to the casing and operable at a lower pressure than the device 35 which is used to prevent excessive flow through the heat exchanger; (typically device 35 may be arranged to vent at a pressure of 25 psi and device 39 at 15 psi by a proper selection of springs). The duct 22b, which in this embodiment supplies line 9a (of FIG. 6) to the pack, is of sufficient width to define with the valve element 16b a narrow gap G when the valve is in the fully non-actuated position shown, so that the acutator feed duct 24b is vented via gap F to duct 22b, which is a point in the system effective to minimize the pressure on the actuator. In this embodiment, this is to the pack. The feed of a minor proportion of the total hydraulic liquid flow to the pack is derived solely from leakage to duct 22b around the valve element 15b and/or valve element 16b and through narrow gap G.

It will be seen by reference to FIG. 5 that when the retarder is in the non-actuated conditon, very little of the hydraulic liquid can pass from inlet duct 26b to the outlet duct 22b (only the valve leakage referred to above) and the device 39 will 'blow' to dump the liquid circulated by the pump back into the reservoir space within the casing; hence the liquid simply flows back directly to the pump inlet. When the retarder is actuated, FIG. 6 applies; in this position, the pack accepts liquid from the duct 22b and hence the lower-pressure relief device 39 does not 'blow' at normal operating pressure, although either it or the device 35 may 'blow' to dump liquid back into the casing if the pressure becomes excessive. Operation of a retarder having a valve 5b is otherwise similar to that described above with reference to FIGS. 1 to 4.

Figure 8:
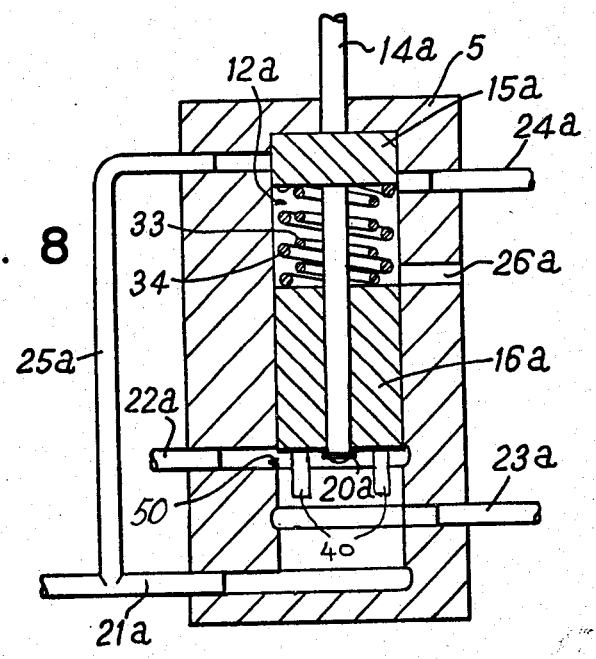
FIG. 8 is a diagrammatic cross-section of another embodiment of the valve means.
Figure 9:
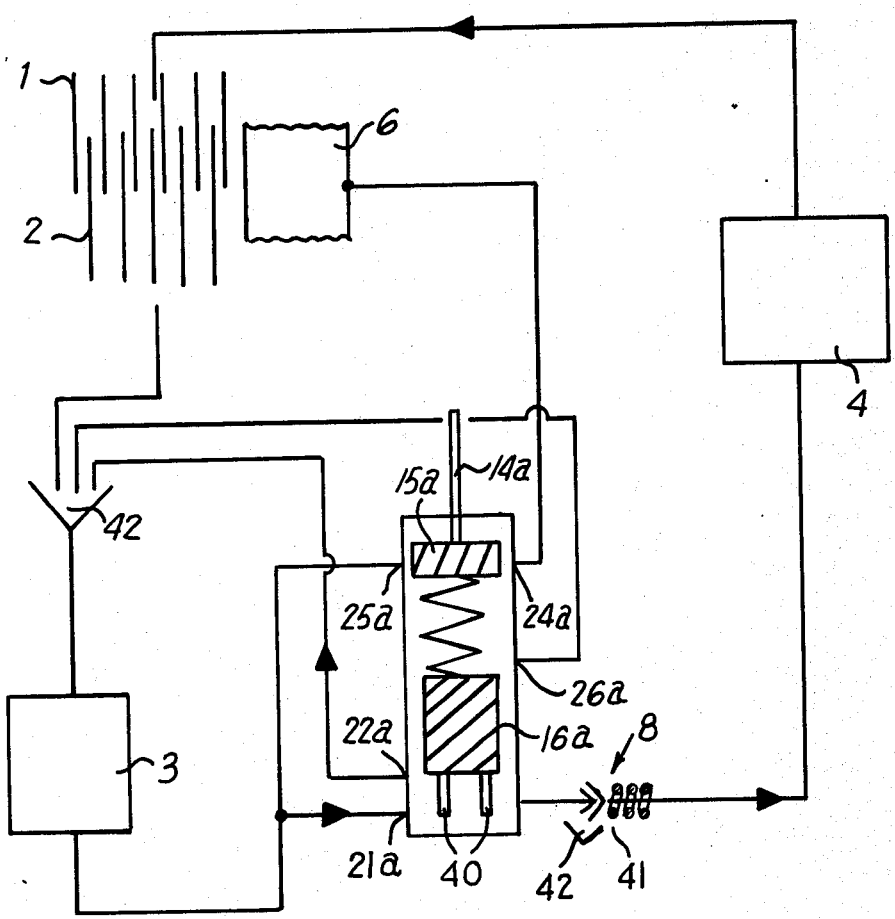
FIG. 9 is a diagram illustrating the hydraulic flow through the circuits of a vehicle brake using the valve means of FIG. 8, in the non-actuated condition.
Figure 10:
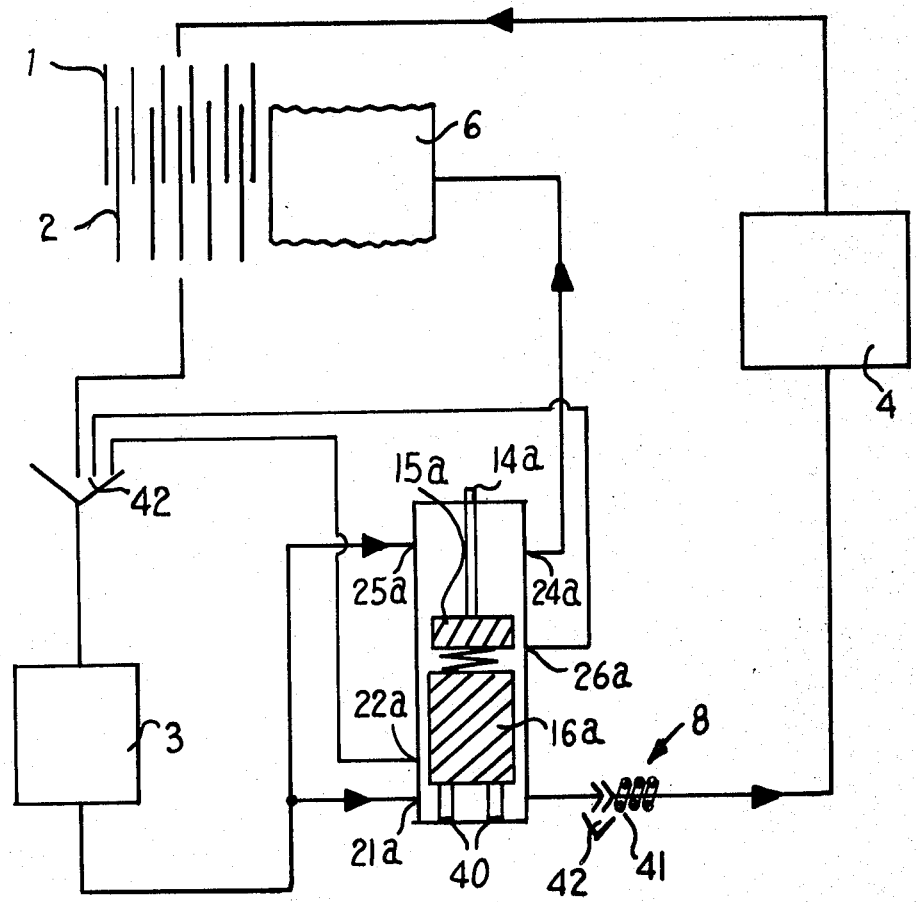
FIG. 10 is a diagram corresponding to FIG. 9, but illustrating the flow in the actuated condition.

In the valve means shown in FIG. 8 like parts bear like reference numerals to those of the previous figures except for the use of the suffix 'a', which is adopted to clarify the following description of the operation of the valve means illustrated in FIGS. 9 and 10, since the mode of operation is somewhat different from that of the valve means previously described. In the embodiment of FIG. 8, the third valve element 18 is omitted and the geometry of the valve is such that a gap 50 is provided at the duct 22a when the valve elementt 15a is at its uppermost position; the valve element 16a is biased against the circlip 20a by two springs, one spring 33 extending the whole distance between the elements 15a and 16a and one spring 34 (similar to spring 17 in FIG. 3) being shorter and of greater compressive strength than spring 33 so that the valve element 16a can ride up against the relatively light spring 33 under pressure until it defines the gap 50 when the retarding device is in the non-actuated condition. This allows the liquid entering at inlet duct 21a to take the path of least resistance back to the casing. At the same time this creates just enough pressure to cause a minor proportion of the liquid to flow directly to the pack through the heat exchanger via duct 23a which has incorporated therein a pressure relief device 41, as shown in FIGS. 9 and 10 when the retarding device is in the non-actuated condition, the flow through duct 23a being restricted as compared to the flow through the duct 22a in view of the fact that the duct 22a opens directly to the casing while the pack and the heat exchanger as well as the associated piping presents considerable resistance to flow. In this embodiment, duct 26a serves to vent surplus liquid from inside the bore 12a to the casing, thereby facilitating operation of the valve means. Duct 24a feeds the actuator bellows (6 in FIGS. 9 and 10), as before, inlet duct 21a corresponding to duct 21b of FIG. 5 and being connected to the pump 3. It will be appreciated from FIGS. 9 and 10 that the pack 1, 2 is fed directly from the heat exchanger through duct 23a and it is important to note that operation of control rod 14a cannot cause valve element 16a to occlude the duct 23a, axial projections 40 being provided to limit the downwards travel of element 16a such that when in the fully actuated condition, the duct 21a still communicates with duct 23a to the heat exchanger 4. However, operation of the valve means and of the brake occurs in a manner broadly analagous to that described previously in relation to the other embodiments.

FIGS. 9 and 10 are, respectively, schematic non-actuated and actuated flow diagrams for the valve means of FIG. 8. For convenience, all the ducts bear exactly the same reference numerals as does FIG. 8. To avoid excessive flow through the heat exchanger and pack a relief valve 41, venting to the casing (designated 42), is provided by way of the venting device 8.

Insofar as the operation of the whole apparatus has previously been described it is believed that FIGS. 8, 9 and 10 will be readily understood by those skilled in the art as exemplifying only one way of carrying out the invention so as to reduce the flow through the pack to a controlled extent when the brake is in the non-actuated condition, thereby significantly reducing frictional drag.

In a brake having a pump rated at 15 gallons per minute per 1000 revolutions per minute of the rotatable shaft, the minor proportion of hydraulic liquid fed to the pack during periods of non-operation of the retarding device may be up to 5 gallons per minute but is preferably from 2 to 3 gallons per minute.

Figure 11:
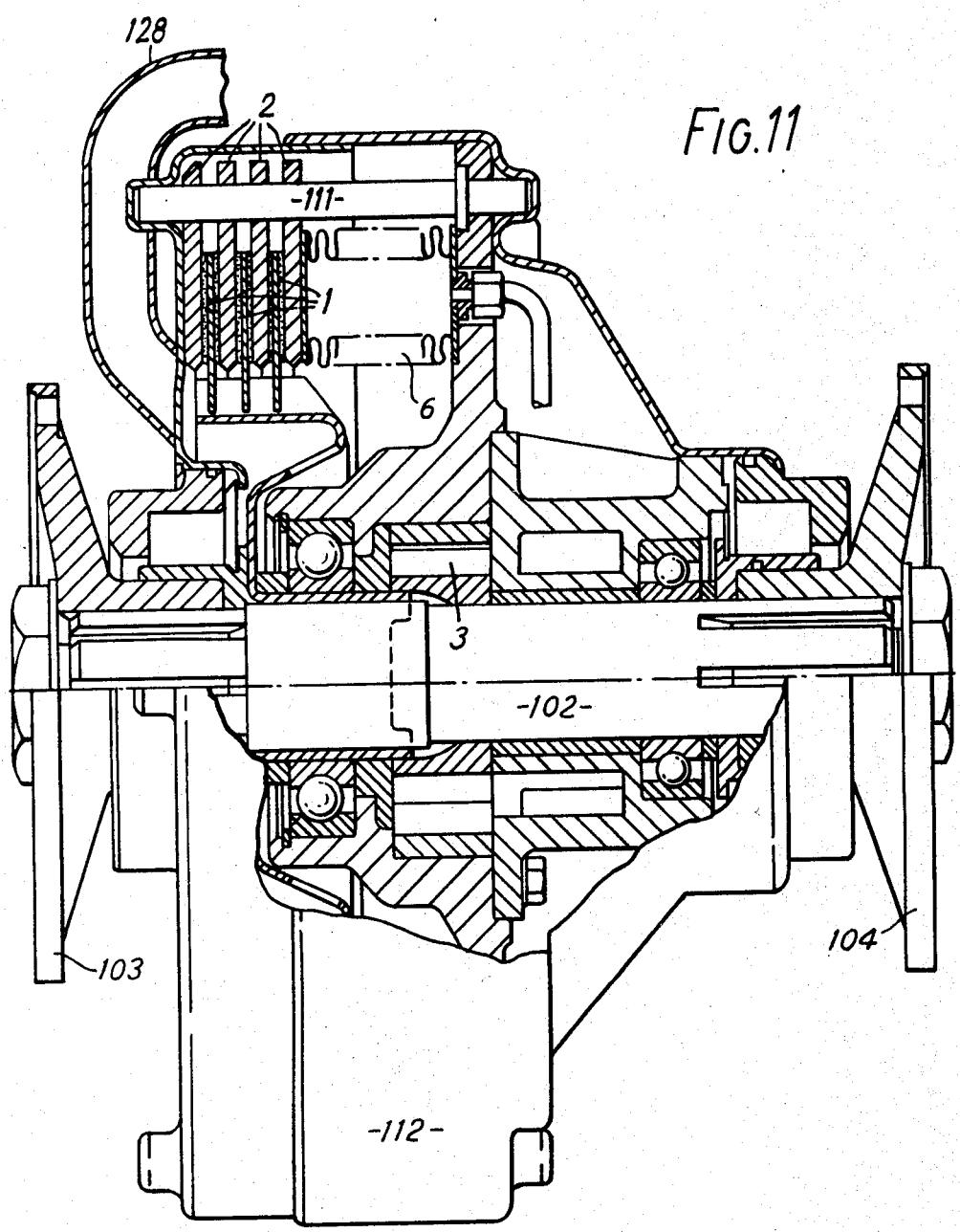
FIG. 11 is a side elevational view, with parts broken away and shown in section, of a hydraulically-operable vehicle retarder with which the brake of this invention is utilized.

In FIG. 11 there is illustrated a vehicle retarder which corresponds to the retarder shown in FIG. 5 of U.S. Pat. No. 3,924,712, which retarder is a typical application of this invention. The retarder has annular friction plates 1 axially slidable on and driven by a rotatable member 102 which is to be braked. The friction plates 1 are inter-leaved with annular friction plates 2 which plates 2 are axially slidable relative to the rotatable member 102 on pins 111 secured in a casing 112 of the vehicle retarder.

The vehicle retarder also includes a pump 3 and a heat exchanger (not shown) having a piping connection 128. It is to be understood that the heat exchanger is external of the vehicle retarder.

The rotatable member 102 is provided at the opposite ends with couplings 103 and 104 so as to enable it to be connected as part of the propeller shaft of a vehicle. The bellows piston actuating means for the friction plates 2 is designated by the reference numeral 6.

In the interests of clarity, FIG. 11 does not show the valve means and hydraulic circuitry of this invention. Further, since the specifics of the mechanical assembly and operation of the vehicle retarder are not part of this invention, they are not described here although full description may be found by reference to the aforementioned U.S. Pat. No. 3,924,712.

Obviously, modifications can be made to the geometry of the various embodiments described above without departing from the spirit of the invention.

We claim:

1. In a hydraulically-operated friction brake of the kind comprising a casing for supporting (i) a rotatable member connectable to a vehicle propeller shaft and (ii) a retarding device which includes a pack of (a) annular friction plates drivably mounted on the rotatable member and (b) annular stator plates supported by said casing and inter-leaved with said friction plates, said pack of plates being relatively slidable axially of said rotatable member under the action of (c) hydraulically operable actuator means so as to bring said plates into contact to generate a retarding torque on said rotatable member, and including (d) means for circulating hydraulic liquid through a hydraulic circuit which includes said plates; the improvement comprising the provision of valve means operable to control the flow of hydraulic liquid to said plates so that (1) during periods of actuation of said retarding device at least a major portion of said flow is directed to said plates and (2) during periods of non-actuation of said retarding device not more than a minor portion of the flow is directed to said plates, and the volume of said hydraulic liquid contained in said brake at the maximum operating temperature thereof is less than the total volume of said casing including said hydraulic circuit and said actuator means, with there always being a liquid-free space within said casing so that said pack of plates will tend to empty itself of liquid into said liquid-free space during periods of non-operation of said brake.

2. The friction brake of claim 1, wherein said valve means includes a body portion defining a bore, a valve element axially slidable in the bore and having first and second valve members, a first of which is fast on the valve element and the second being slidable on the valve element and urged away from the first member by means of a spring means, and inlet and outlet means for passage of hydraulic liquid into and out of the valve means disposed so that said major portion of the flow of hydraulic liquid is directed through the bore to the plates when the valve element is in a first position and so that not more than said minor portion of the flow of hydraulic liquid is directed to the plates when the valve element is in a second position axially displaced relative to the first position.

3. The friction brake of claim 2, wherein said spring means includes first and second springs, the second valve member is initially urged away from the first valve member by said first spring during periods of nonactuation of the retarding device, and said second spring is of shorter axial length than said first spring and greater compressive strength and is provided to compensate for undue variation of pressure on the face of the second valve member remote from the first valve member.

4. The friction brake of claim 2, wherein a third valve member is provided by a pressure sensitive valve device in an outlet from the bore communicating with said cooling means for the hydraulic liquid.

5. The friction brake of claim 2 wherein there is a tubular third valve member mounted on said valve element in spaced relation to said second valve member and in said valve first position closing flow to said plates while permitting hydraulic fluid circulation through said valve.

6. The friction brake of claim 1, including a heat-exchanger in fluid communication with the valve means and having a liquid outlet from said valve means, and wherein a pressure relief device is associated with said outlet to permit the hydraulic liquid to bypass the heat-exchanger, in response to excessive liquid pressures developed therein during use of the brake.

7. The friction brake of claim 1, wherein said valve means including a body portion defining a bore, a plurality of passages opening into said bore, said passages defining in axial sequence:
   (1) an auxiliary from said pump,
   (2) a passage to said hydraulically operable actuator means,
   (3) a vent passage to said casing,
   (4) a dump passage,
   (5) a passage to said plates, and
   (6) a passage from said pump;
and a valve element axially slidable in said bore and including first and second valve members carried by said valve element, said first valve member being uppermost and fixed on said valve element, said second valve member being slidable on said valve member, spring means urging said second valve member away from said first valve member; and in said first position said first valve member is at the upper end of said bore closing said auxiliary passage and blocking normal communication with said vent passage and said passage to said hydraulically operable actuator means through said bore, and said second valve member being positioned between said vent passage and said dump passage.

8. The friction brake of claim 7, wherein said spring means includes first and second springs, the second valve member is urged away from the first valve member by said first spring during periods of nonactuation of the retarding device, and said second spring is initially of shorter axial length than said first spring and greater compressive strength and is provided to compensate for undue variation of pressure on the face of the second valve member remote from the first valve member.

9. The friction brake of claim 7 wherein there is a tubular third valve member mounted on said valve element in spaced relation to said second valve member and in said valve first position closing flow to said plates while permitting hydraulic fluid circulation between said passage from said pump through said third valve member to said dump passage.

10. In a hydraulically-operated friction brake of the kind comprisng a casing for supporting (i) a rotatable member connectable to a vehicle propeller shaft and (ii) a retarding device which comprises (a) annular friction plates drivably mounted on the rotatable member, (b) annular stator plates supported by the casing and interleaved with said friction plates, the plates being relatively slidable axially of said rotatable member under the action of (c) a hydraulically operable actuator means so as to bring the plates into contact to generate a retarding torque on the rotatable member, and including (d) means for circulating hydraulic liquid through a hydraulic circuit which includes the plates, the improvement comprising the provision of valve means operable to control the flow of hydraulic liquid to the plates so that (1) during periods of actuation of the retarding device at least a major portion of said flow is directed to the plates and (2) during periods of non-actuation of the retarding device not more than a minor portion of the flow is directed to the plates, cooling means and a pump for circulating said hydraulic liquid through said cooling means and through first and second hydraulic circuits, said first circuit being for the actuation of the retarding device and said second circuit being for the circulation of the hydraulic liquid during periods of actuation and non-actuation of the retarding device, said second circuit including said valve means, said valve means including a body portion defining a bore, a valve element axially slidable in the bore and having first and second valve members, a first of which being fast on the valve element and the second being slidable on the valve element and urged away from the first member by means of a spring means, and inlet and outlet means for passage of hydraulic liquid into and out of the valve means disposed so that said major portion of the flow of hydraulic liquid is directed through the bore to the plates when the valve element is in a first position and so that not more than said minor portion of the flow of hydraulic liquid is directed to the plates when the valve element is in a second position axially displaced relative to the first position, said spring means including first and second springs, the second valve member being urged away from the first valve member by said first spring during periods of non-actuation of the retarding device, and said second spring being initially of shorter axial length than said first spring and greater compressive strength and being provided to compensate for undue variation of pressure on the face of the second valve member remote from the first valve member.

* * * * *